JOHN COOK, OF NEW YORK, N. Y.

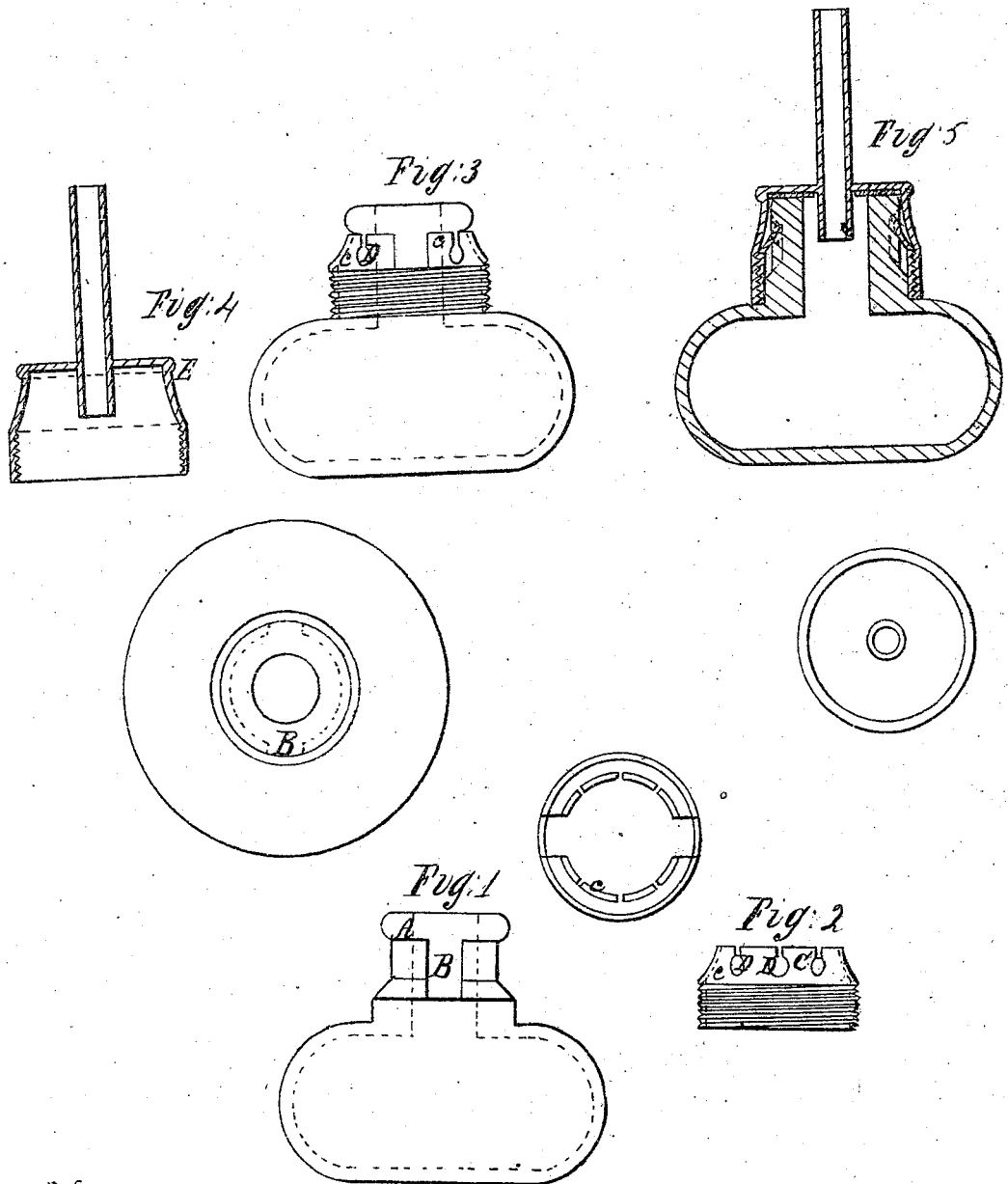

*Letters Patent No. 87,146, dated February 23, 1869.*

IMPROVED SCREW-COLLAR FOR CONNECTING COVERS TO GLASS VESSELS.

*The Schedule referred to in these Letters Patent and making part of the same.*

*To all whom it may concern:*

Be it known that I, JOHN COOK, of the city of New York, county and State of New York, have invented a new and useful Device for an Air-Tight Spring-Joint.

The object of my invention is to connect, without the use of cement or solder, two vessels, or a vessel and its cover, and make the joint secure against leakage.

The advantage of my joint is, that it is peculiarly adaptable for connecting glass or any fragile material with metal, and to permit the frequent opening and closing of the joint, without impairing its usefulness.

In order to show clearly the nature of my invention, and to enable those skilled in the arts to make and use it, I will proceed to describe its formation and use, reference being had to the drawings that accompany this specification, and making a part thereof.

At the margin or mouth-piece of a bottle, jar, or other vessel, or on any suitable part thereof, a rim or projecting ring is placed, under which, at two points, there are two small shoulders, all properly shaped when the vessel is originally moulded or blown. A band tapering at the top, is made, the lower part sufficiently large to pass over the projecting ring and shoulders, the upper tapered part being of a smaller circumference, but with several openings and slits around it, to permit it to open at various points, and thus pass over the projections and immediately spring back, close again, and tightly come together under the ring. Around the outside of the band, on required portions, a thread is cut, and certain openings are made for the shoulders to project through.

The second part of the joint fits over the above-described band, and has a thread cut in the inside, the whole tapering slightly at the top.

It will thus be apparent, that when these two parts are screwed together, the upper, and smaller portion of the band will be pressed upward and inward, and against the projecting ring, clasping closely and firmly the parts under it, the two projecting shoulders preventing the band from turning round. The openings in the upper part of the band permit it to adjust itself to the size required to make the connection secure and tight.

The accompanying drawings further illustrate my invention.

Figure 1 represents a glass oil-cup. A is the projecting ring; B, the projecting shoulder.

Figure 2 represents the band. C is the tapering top; D D, the openings, enabling it to separate and pass over the rim A in fig. 1.

Figure 3 represents a cup as in fig. 1, with the band, as in fig. 2, slipped on.

Figure 4 represents a sectional view of the cover. E is the tapering top.

Figure 5 represents a sectional view of cup with band and cap on.

I am aware that fastenings have been made heretofore, by screwing metallic collars up and against the flange on the neck of a vessel, but these collars have been placed on, either in sections, or by being bent.

I am not aware of any band, or collar, having been made as mine is, of a graduated or tapering shape, with certain springs placed around it, so as to enable it to separate, enlarge its size temporarily, and allow it to pass over impending projections, and then to spring back again, and adjust itself to the required size.

I am aware that in the patent of F. Klee, January 19, 1869, a device is made to fit the inside of the neck of a vessel, in which position I do not claim or propose to use mine.

My collar is especially designed for use on the outside, being made with a view to fit and grasp the exterior only, by which I maintain a firmer and closer hold than could be secured inside, and with far less liability to break a fragile vessel.

Having now fully described my invention,

What I claim as new and useful, and desire to secure by Letters Patent, is—

A tapering collar for the neck of a vessel, with openings D D, arranged so as to separate when passing over a projecting flange or shoulder, and then spring back again, substantially as described, and for the purpose intended.

JOHN COOK.

Witnesses:
THOMAS ALLISON,
M. H. NATHAN.